United States Patent
Bomholt et al.

(10) Patent No.: US 8,090,464 B2
(45) Date of Patent: *Jan. 3, 2012

(54) METHOD AND SYSTEM FOR ENHANCING THE YIELD IN SEMICONDUCTOR MANUFACTURING

(75) Inventors: Lars Bomholt, Feusisberg (CH); Jim Chalmers, Danville, CA (US); Wolfgang Fichtner, Zurich (CH)

(73) Assignee: Synopsys, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/208,279

(22) Filed: Sep. 10, 2008

(65) Prior Publication Data

US 2009/0005894 A1 Jan. 1, 2009

Related U.S. Application Data

(63) Continuation of application No. 11/139,110, filed on May 27, 2005, now Pat. No. 7,792,595, which is a continuation-in-part of application No. 11/092,967, filed on Mar. 29, 2005, now abandoned.

(60) Provisional application No. 60/557,382, filed on Mar. 30, 2004.

(51) Int. Cl.
*G06F 19/00* (2011.01)

(52) U.S. Cl. ............... 700/121; 700/29; 700/32; 700/97

(58) Field of Classification Search .................... 700/97, 700/107, 29, 32, 121; 716/1; 703/4, 13
See application file for complete search history.

(56) References Cited

U.S. PATENT DOCUMENTS

| | | | |
|---|---|---|---|
| 4,901,242 A | 2/1990 | Kotan et al. |
| 5,051,373 A | 9/1991 | Yamada et al. |
| 5,105,362 A | 4/1992 | Kotani et al. |
| 5,946,211 A | 8/1999 | Glover |
| 6,028,994 A | 2/2000 | Peng et al. |
| 6,728,937 B2 | 4/2004 | Wakita et al. |

(Continued)

FOREIGN PATENT DOCUMENTS

JP 63249328 10/1988

(Continued)

OTHER PUBLICATIONS

Michael Duane, "The role of TCAD in Compact Modeling" Nano Science and Technology Institute (NSTI), 2002.*

(Continued)

*Primary Examiner* — Kakali Chaki
*Assistant Examiner* — Nathan Laughlin
(74) *Attorney, Agent, or Firm* — Kenta Suzue; Haynes Beffel & Wolfeld LLP

(57) ABSTRACT

Roughly described, a manufacturing process is enhanced by using TCAD and TCAD-derived models. A TCAD simulation model of the process is developed, which predicts, in dependence upon a plurality of process input parameters, a value for a performance parameter of a product to be manufactured using the process. Estimated, predicted or desired values for a calculated subset of the parameters (including either process input parameters or product performance parameters or both), are determined in dependence upon the process model, and further in dependence upon actual, estimated or desired values for a different subset of the parameters (again either process input parameters or product performance parameters or both). The determination is preferably made using a process compact model of the process, itself developed in dependence upon the simulation model.

14 Claims, 4 Drawing Sheets

U.S. PATENT DOCUMENTS

| | | |
|---|---|---|
| 6,834,212 B1 | 12/2004 | Patel et al. |
| 6,917,849 B1 | 7/2005 | Pasadyn et al. |
| 2001/0007143 A1 | 7/2001 | Wakita et al. |
| 2003/0216827 A1 | 11/2003 | Mouli |
| 2004/0064296 A1 | 4/2004 | Saxena et al. |

FOREIGN PATENT DOCUMENTS

| | | |
|---|---|---|
| JP | 02298103 | 12/1990 |
| JP | 11135611 | 5/1999 |
| JP | 2001188816 | 7/2001 |
| JP | 2002109446 | 4/2002 |

OTHER PUBLICATIONS

R. Strasser, R. Plasun and S. Selberherr, "Practical Inverse Modeling with SIESTA," in Proc. Simul. Semiconduct. Process. Devices, Kyoto, Japan, Sep. 1999, pp. 91-94.

* cited by examiner

METHOD AND SYSTEM FOR ENHANCING THE YIELD IN SEMICONDUCTOR MANUFACTURING

CROSS-REFERENCES

This application is a Continuation of U.S. patent application Ser. No. 11/139,110 filed 27 May 2005, which is a Continuation-In-Part of U.S. patent application Ser. No. 11/092,967 filed 29 Mar. 2005, which claims the benefit of Provisional Application No. 60/557,382 filed 30 Mar. 2004. All parent applications are incorporated herein by reference in their entirety.

1. FIELD OF THE INVENTION

The invention relates to a method for enhancing the yield in semiconductor manufacturing, a computer program product and a system for enhancing the yield in semiconductor manufacturing.

2. BACKGROUND AND SUMMARY OF THE INVENTION

Technology Computer Aided Design (TCAD) uses physics-based computer simulations to design, analyze, and optimize semiconductor devices. TCAD represents the available physical knowledge of semiconductor processing and devices in terms of computer models. It represents devices as one dimensional, two-dimensional or three-dimensional finite-element or finite-volume models. Each element represents a piece of a certain material, with certain properties. TCAD numerically solves partial differential equations in space and/or time with appropriate boundary conditions. Typically this is done with finite element or finite volume analysis, although in some cases other methods for solving the partial differential equations can be used, such as particle/atomistic methods.

TCAD consists of two major components:
1. Process simulation is modeling semiconductor manufacturing processes. The simulation starts with the bare wafer and finishes with device structures. Processes such as implantation, diffusion, etching, growth, and deposition processes are simulated on a microscopic level.
2. Device simulation is modeling the semiconductor device operation on a microscopic level. By integrating microscopic currents, the electrical behavior is characterized. SPICE model parameters can be extracted from the simulated electrical characteristics.

Today's TCAD tools are capable of modeling the entire semiconductor manufacturing process and product performance with physical models of varying sophistication. Typically, from the simulation-derived device characteristics it is possible to extract model parameters for so-called (lumped) circuit models, i.e., which can be used in circuit simulators such as SPICE, which is often used as a central tool in Electronic Computer Aided Design (ECAD) to generate circuits.

While in TCAD typically few semiconductor devices are simulated with very high sophistication in terms of physical models, in ECAD more devices can be simulated, but the models for the individual devices are enormously reduced in complexity and sophistication. TCAD is applicable to all semiconductor devices, notably diodes, transistors, optical devices such as LEDs, lasers, specific test structures for process control, and others.

It is known to use circuit simulations during the manufacturing process of a semiconductor product. E.g. in JP 2001/188816 a method for manufacturing a transistor is described, where the gate length and the gate width are calculated using a circuit model. The calculation is performed on the basis of measurement results during the manufacturing.

TCAD allows an understanding of the manufacturing process and the operation of semiconductor devices and is therefore often used in research and development for the development of new processes and devices. Notably, it allows to save cost by reducing the number of costly experiments.

One goal of the present invention is to use TCAD to address issues of process and device variability in manufacturing. The simulation experiments in TCAD have the advantage that every process condition can be accurately controlled, and that arbitrary product performance characteristics can be determined. This is as opposed to real experiments, where the control of process steps may be difficult and subject to uncontrollable drift or variation in the equipment, and where the limitations of metrology can make it difficult, expensive or impossible to make measurements both in non-destructive and destructive measurements.

In particular, it is important to improve the systematic yield in semiconductor manufacturing of products where the structure of the semiconductor product is smaller than 130 nm. In this range the yield is increasingly subject to other limiting factors than just defects. Notably, addressing the parametric yield issues that arise through process and device variability is very important. Nonetheless, aspects of the present invention can be used advantageously also for structures above 130 nm.

Unfortunately, while TCAD simulations can be made very accurate, they are still very time consuming to execute. A single reasonably accurate 2-dimensional simulation of a MOSFET device may take on the order of an hour or more to execute. This deficiency severely limits the practicality of using TCAD in manufacturing, as opposed to design and development.

TCAD allows users to model the semiconductor manufacturing also in form of process models, where the semiconductor manufacturing process is described in terms of a number of input parameters and output parameters. Such a model is referred to as a TCAD Process Model. In accordance with an aspect of the invention, roughly described, simplified models or TCAD Process Compact Models (PCMs) can be derived from the TCAD Process Model, to describe the connection of input parameters and output parameters with less computational complexity. Input parameters may be process step characteristics, output parameters may be resulting product performance characteristics (including resulting process characteristics).

The invention can be particularly useful in the production ramp-up, when new processes and/or new products are introduced. Using simulation at this stage is advantageous because conventional methods for improvement rely only on measured data, which is not available in quantity during the production ramp. The use of simulation results to complement measured data is therefore especially valuable.

Also, the invention can be used for volume manufacturing. By applying the method according to the present invention to volume manufacturing the yield is enhanced for a great number of products. The benefit of the invention is therefore increased.

Further, the TCAD models can be applied to semiconductor manufacturing for the purpose of predicting parametric chip yields both during and subsequent to the wafer fabrication manufacturing process, i.e., to manipulate the manufacturing of either the same product batch or future product batches.

As well, the application of TCAD simulation, TCAD Process Model and/or TCAD Process Compact Model to semiconductor manufacturing processes at multiple semiconductor manufacturing facilities for the purpose of understanding the electrical differences between the similar but not identical processes is possible. In this case, measured data from each individual manufacturing process can be compared to a common TCAD simulation, TCAD Process Model and/or TCAD Process Compact Model in addition to being compared to each other. In this case they serve as a reference simulation which makes the process differences more understandable.

TCAD Process Compact Models can be obtained from TCAD simulations by performing a comprehensive Design of Experiment, consisting of individual experiments. In the Design of Experiments, input parameters are systematically varied and for each of the variants the output parameters are determined. As used herein, each combination of input parameter values and its resulting output parameter values is referred to as a "data set", and two data sets are considered "different" if the value of at least one parameter in one data set differs from the value of the same parameter in the other data set. The collection of the data sets is sometimes referred to herein as a database, and as used herein, the term "database" does not necessarily imply any unity of structure. For example, two or more separate databases, when considered together, still constitute a "database" as that term is used herein.

The individual experiments are performed using TCAD simulations. From the set of performed experiments a simplified representation is derived, which can approximate for a given set of input parameters the output parameters. The simplified representation is typically called a response surface. The response surface can be represented by functions that are fitted to the performed TCAD experiments by regression, or by tabulation and interpolation of the experiments. Methodologies include response surfaces models that consist of polynomial expressions, which are obtained by least squares fitting; neural networks, in which a certain type of nonlinear function is fitted to data using optimization algorithms; or other mathematical functions or tables which can be further interpolated. The user can choose whether to use methodologies that have zero error for the experiments used for fitting, or whether a residual error in the experimental points is permitted.

FIG. 1 is a flowchart of steps that can be used in creating a TCAD Process Compact Model. In step 110, a TCAD simulation flow is created that replicates in simulation the product manufacturing process as well as the process of determining the product performance. In step 112, the TCAD simulation flow is parameterized with parameters of interest $p_i$ (i=1, ... n) that allow to influence the manufacturing process, and extract the product performance characteristics as values $r_1$ (i=1, ..., m).

In step 114, a "Design of Experiment" table is set up with parametric variations for the parameters $p_i$. Typically a systematic design is chosen such as a full factorial 3-level design. Alternatively, other designs can be chosen, such as face-centered-composite design, Taguchi design, or similar. As an example, for a full factorial with 2 parameters $p_1$ and $p_2$ with three levels each, for the parameter $p_1$ the values 1, 2 and 3, and for the parameter the values 4, 5, 6, we obtain the following experimental matrix

| Experiment | Value $p_1$ | Value $p_2$ |
|---|---|---|
| 1 | 1 | 4 |
| 2 | 1 | 5 |
| 3 | 1 | 6 |
| 4 | 2 | 4 |
| 5 | 2 | 5 |
| 6 | 2 | 6 |
| 7 | 3 | 4 |
| 8 | 3 | 5 |
| 9 | 3 | 6 |

In step 116, the TCAD simulations are performed for each of the parameters, obtaining the product performance characteristics $r_i$. Each of the experiments will usually take a considerable amount of time, as previously mentioned. Each of the experiments is an evaluation of the TCAD Process Model. As an example, for the above experimental design the resulting table is for 3 performance characteristics $r_1$, $r_2$, and $r_3$

| Experiment | Value $p_1$ | Value $p_2$ | Value $r_1$ | Value $r_2$ | Value $r_3$ |
|---|---|---|---|---|---|
| 1 | 1 | 4 | 5 | 17 | 66.71828 |
| 2 | 1 | 5 | 6 | 20 | 127.7183 |
| 3 | 1 | 6 | 7 | 23 | 218.7183 |
| 4 | 2 | 4 | 6 | 25 | 71.38906 |
| 5 | 2 | 5 | 7 | 29 | 132.3891 |
| 6 | 2 | 6 | 8 | 33 | 223.3891 |
| 7 | 3 | 4 | 7 | 35 | 84.08554 |
| 8 | 3 | 5 | 8 | 40 | 145.0855 |
| 9 | 3 | 6 | 9 | 45 | 236.0855 |

In step 118, the TCAD Process Compact Model is derived by fitting functions $r_j(p_1, \ldots, p_n)$ (j=1, ... m) to the values in the table. This can be for example a polynomial function $r_i = A*p_1^2 + B*p_2^2 + C*p_1*p_2 + D*p_1 + E*p_2 + F$, with coefficients A, B, C, D, E, F to be determined by a least squares fitting process, resulting, for example, in the function $r_2(p_1, p_2, p_3) = p_1 + 2*p_2 + p_1*p_1 + 3 + p_1*p_2$. It should be noted that arbitrary other functions or representations can be used, among others nonlinear functions, fitted by a nonlinear optimization process, and tabulated functions with interpolation. In practice the choice of approximation function influences accuracy and performance of the approximation.

In step 120, The TCAD Process Compact Model is then checked for accuracy, by comparing values predicted by the TCAD Process Compact Model to values generated by the TCAD Process Model, either in the original experiments used for creating the TCAD Process Compact Model or in an additional set of test experiments. Although there is generally a certain loss of accuracy incurred by using an approximation function, an appropriate choice of "Design of Experiment" and an appropriate choice of approximation function can bring down the error to a reasonably small amount. It may be necessary to extend the Design of Experiment and/or change the approximation function to increase accuracy. This is performed by going back to step 114 or step 118.

Once the TCAD Process Compact Model is ready for use, the user has a simplified representation of the process-product relationships with a considerably lower size and implementational complexity. We therefore refer to it as a TCAD Process Compact Model, as opposed to a TCAD Process Model.

Example: As an illustration, we show a TCAD Process Model or TCAD Process Compact Model can contain a number of reasonable, but in no way complete process parameters and device characteristics, given for the example of a NMOS and a PMOS device in a CMOS process. Process parameters: $p_1$) gate oxide thickness, $p_2$) gate length, $p_3$) halo implant tilt, $p_4$) halo implant dose, $p_5$) final RTP (rapid thermal annealing) temperature. The product performance characteristics are in this case $r_1$) the threshold voltage $V_T$, $r_2$) the drive current $I_{ON}$, $r_3$) the leakage current $I_{OFF}$, $r_4$) the switching speed of an inverter. A 3-level, full factorial DoE will result 243 experiments. Typically, gate oxide thickness as well as gate length or critical dimension are measured in the process, whereas halo implant tilt and dose as well as final RTP temperature are assumed to be given by process equipment settings and are not measured. Device performance characteristics $V_T$, $I_{ON}$, $I_{OFF}$ are typically measured on the wafer, whereas inverter switching speed is not typically measured here and serves as a simple example for product performance. We will refer to this particular PCM below.

The use of TCAD Process Compact Models over the TCAD Process Model can have considerable advantages over the direct use of TCAD, even though there is an approximation error and therefore a loss of accuracy involved. TCAD tools are typically very complex, with the complexity rising with the growing accuracy of physical modeling. In practice, TCAD simulations take considerable time to perform. In addition, TCAD tools due to their complexity are in general sufficiently robust for a research and development environment, but not for a production environment. TCAD Process Compact Models, on the other side, have much less complexity, are therefore much more robust towards program failures, and can be evaluated in a much shorter time. As an example, a typical 2-dimensional process and device simulation using TCAD currently takes typically one hour, whereas a TCAD Process Compact Model can typically be evaluated in less than a microsecond. The disadvantage of the process compact model is that only the predefined output parameters are available, whereas each TCAD simulation typically generates a comprehensive representation of a semiconductor device that can subsequently be examined and probed in arbitrary ways. In the present targeted application, the latter is typically not required, and the TCAD Process Compact Model has therefore considerable practical advantages.

As no manufacturing process is perfect, the products obtained in real manufacturing are subject to manufacturing defects or their performance differs from the targeted results, resulting in non-optimum defect yield and non-optimum systematic yield. In semiconductor manufacturing, this problem of process defects and process variability is generally increasing with smaller technologies. Currently, it is addressed through yield management systems and simple models to correct the processes.

Some drawbacks of existing techniques are
that the known models for controlling and correcting processes at this point are very limited in their applicability, by not being able to encompass a sufficiently high number of process parameters and their interactions, or by not being able to accommodate the nonlinearity of some parameters.
that creating process models or process compact models from purely experimental data requires costly experiments.
that not all process parameters can be measured at all or at reasonable cost and are therefore not amenable to conventional process control and yield management
that not all product performance parameters can be measured at all or measured at reasonable cost, and are therefore not amenable to conventional process control and yield management.

It is an object of the present invention to overcome the drawbacks of the prior art, in particular to provide economical methods for enhancing the systematic yield in semiconductor manufacturing, in particular the part of the systematic yield that is caused by nonoptimality, variation and drift in semiconductor manufacturing process steps. This object is addressed with a method, a system and a computer program product as described herein.

BRIEF DESCRIPTION OF THE DRAWINGS

The invention will be described with respect to particular embodiments thereof, and reference will be made to the drawings, in which.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
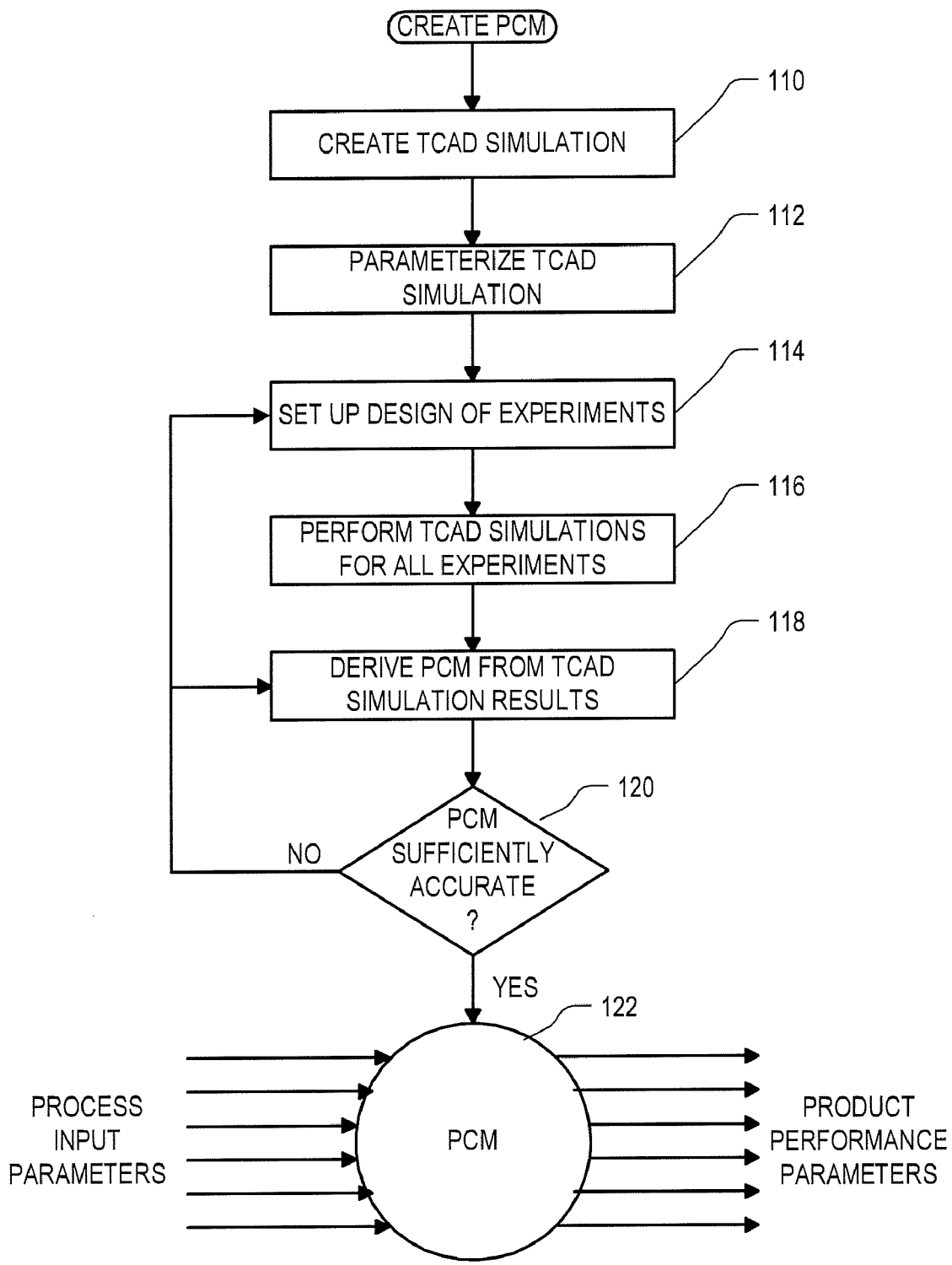
FIG. 1 is a flowchart of steps that can be used in creating a TCAD Process Compact Model in accordance with aspects of the invention.

In FIG. 1, a PCM 122 is shown together with its process parameter inputs and its product performance parameter outputs. The PCM can be used in a variety of different ways to enhance the manufacturing process. In various different use scenarios, actual or desired values are provided for some of the parameters, and actual or desired values are determined using the PCM for one or more of the remaining parameters. The "provided" parameters are not limited to the process input parameters, nor are the "determined" parameters limited to the product performance parameters. In many of the most useful scenarios, in fact, the "provided" parameters include one or more of the product performance parameters, and the PCM is used to determine one or more of the process input parameters which either were not measured, or are not susceptible to measurement. In these cases, optimization algorithms or data mining techniques can be used with the PCM to determine actual or desired values for the unknown parameters. The use of a PCM instead of a full TCAD process model to execute these algorithms and techniques renders them practical.

Three example use cases will now be described in order to illustrate various ways in which a PCM can be used to enhance a manufacturing process.

Use Case No. 1: Generation of Data for Performance Prediction or Yield Management, Both Simulated Data Equivalent to Measured Device/product Performance Data, and Data Predicting Device/product Performance Data That Is Not Measured.

Figure 2:
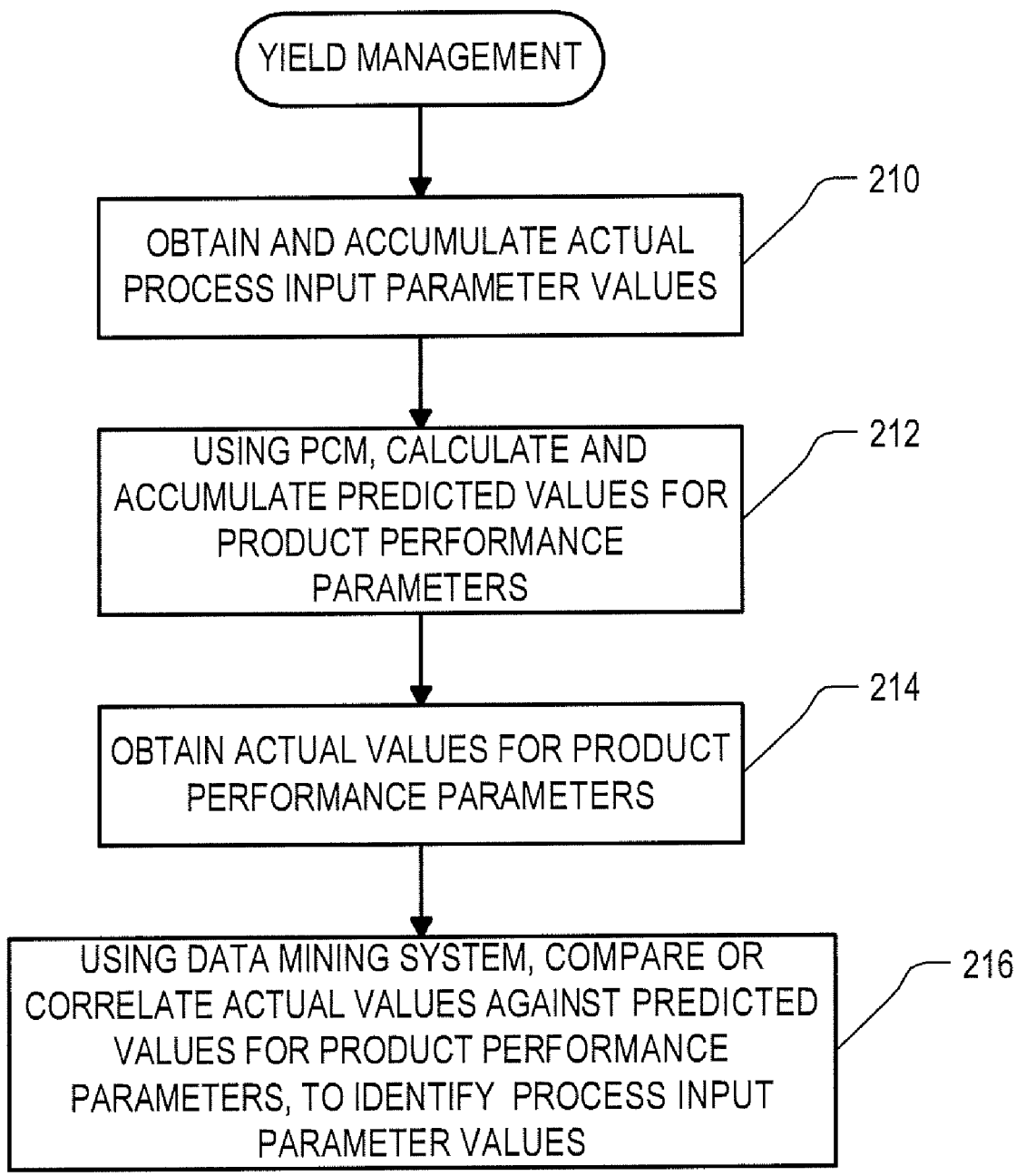
FIGS. 2-4 are flowcharts illustrating different use cases for aspects of the invention.

TCAD allows the user to complement and compare measured data from the production process with the corresponding simulated data. FIG. 2 is a flowchart illustrating how a PCM can be used with measured process data to predict a device characteristic by simulation.

In step 210, actual process input parameter values are obtained and accumulated. Step 210 results in values $p_1, \ldots, p_n$ characterizing characteristical features of the process steps, such as film thickness, gate critical dimension, implant angle and dose, anneal temperature, etc. As used herein, an "actual" value for a parameter is one that exists and is either measured, or is "assumed" based on equipment settings. An "vestimated" value is also one that exists, but it is estimated through the use of TCAD or a TCAD-derived model. The terms "actual" and "estimated" distinguish over values which do not yet exist, such as "desired" and "not-yet-determined" values. A "not-yet-determined" value is one that is not yet in existence, typically because the process steps it would characterize have not yet been performed or the partially or fully completed product it would characterize does not yet exist. If not-yet-determined values are required, they can be "predicted" by TCAD or a TCAD-derived model, based on provided, actual, assumed or estimated, process input parameter values. For certain purposes not-yet-determined values can also be "assumed" because there is little doubt about what the value will be. One example of an assumed not-yet-determined value is the value of a process parameter used in a process step that has not yet occurred, but for which the equipment that will be used typically produces only one value. Another example is a product performance characteristic "predicted" by TCAD or a TCAD-derived model. The terms "actual" and "estimated" also distinguish over "example" values, such as might be used when exploring example process input parameters in an effort to identify desired values for them which are predicted to yield desired product performance parameters, or such as might be used when creating a data set.

In step 212, the PCM is evaluated for each of the actual process input parameter values, resulting in predicted values $r_1, \ldots, r_m$. The predicted values $r_1, \ldots, r_m$ are accumulated and made available in a data-mining system such as a yield management system for subsequent comparison or correlation with actual data obtained from a production lot. In particular, in step 214, actual and/or estimated values are obtained from an actual production lot or lots, and in step 216, the difference between predicted data and actual or estimated data can be used in data mining techniques used in production for finding process deviations, process drift, or changing influences by process parameters that are not captured in the TCAD Process Model or TCAD Process Compact Model.

Example: Referring to the TCAD Process Compact Model described above, gate oxide thickness and gate critical dimension are typically measured for each product wafer. For halo implant tilt, halo implant dose and the final RTP temperature, the equipment setting values in the corresponding process steps can be used. The device performance data $V_T$, $I_{ON}$, and $I_{OFF}$ can all be predicted by the TCAD Process Compact Model and be measured in-line. The comparison of the predicted device performance and measured device performance, as an example, can be used to analyze whether any variations in product performance are likely to be caused by related variations in gate oxide thickness and gate critical dimension, or whether variations or drifts in halo implant dose, halo implant tilt, or final RTP temperature or a variation of other process parameters are likely causes for the inconsistency between predicted and observed device performance. Furthermore, using the actual in-process data, it is possible to predict and therefore monitor non-measured product performance such as inverter switching speed. The quality of the predicted product performance data is likely to move synchronously with the quality measure obtained by comparing the predicted device performance data with the measured device performance data.

A particular advantage of using data from TCAD Process Model and TCAD Process Compact Model is that, by nature, these models are not subject to noise, uncertainties and drift as occur in the manufacturing process. The combination and correlation of measured data with simulated data is therefore particularly valuable.

In addition to providing simulated product performance data that replicate measured product performance data, TCAD Process Models and TCAD Process Compact Models also allow to analyze, regulate and optimize device characteristics that are conventionally not measured in manufacturing because such measurement is fundamentally not possible, difficult or uneconomical. A parameter is considered herein to be "commercially incapable of measurement" if either it cannot be measured, or it can be measured but is deemed not feasible or economical to do so in a commercial context. Examples may be the transient characteristics, noise characteristics, high-frequency characteristics, the performance of small circuits with particularly high sensitivity to process parameters, or similar. Notably, such additional data for predicted product performance can be used in conventional yield managements systems. On the basis of the predicted product performance the yield of manufacturing can be analyzed and improved, with respect to other performance criteria than the conventionally measured and available ones.

Use Case No. 2: Inverse Analysis

Figure 3:
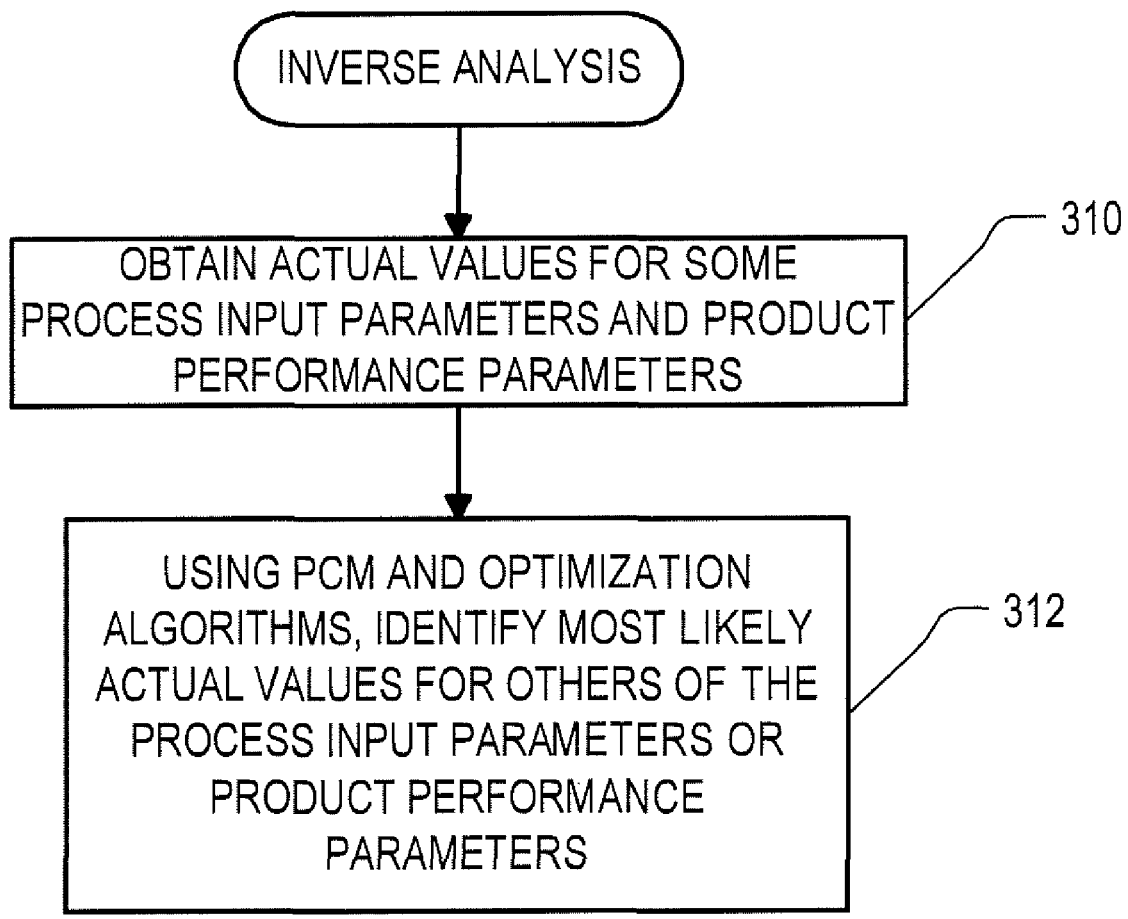

With the use of the present invention non-measured or non-measurable parameters, e.g., implant doses, implant tilt angles, gate shape characteristics, layer thicknesses, or similar, can be calculated with the simulation software, using other measurements and indirectly estimating the parameters of interest. This software can be a TCAD simulation, a TCAD Process Model and/or a TCAD Process Compact Model, but is preferably a TCAD Process Compact Model. The non-measurable parameters are reconstructed by inverse analysis of a TCAD Process Model or TCAD Process Compact Model from measurements of device characteristics of semiconductor devices and/or test structures. Inverse analysis uses an optimization algorithm in which the input parameters whose values are known through measurements and output parameters that are known through measurements are provided (taken as given) and the unknown input parameters to the process compact model, which represent the non-measured parameters, are optimized by changing them in a mathematical optimization algorithm until the residual error becomes minimal. FIG. 3 is a flow-chart illustrating major steps in the Inverse Analysis use case.

In step 310, actual values are obtained and accumulated for some of the process input parameters and product performance parameters. These values can be obtained, for example, by measuring on product wafers, or by assumption from the process equipment settings. This results in values $p_1, p_2, \ldots, p_k$ characterizing characteristical features of the process steps such as film thickness, gate critical dimension, implant angle and dose, anneal temperature, etc. This also results in values $rm_1, rm_2, \ldots, rm_m$, characterizing product performance.

In step 312, using a TCAD Process Compact Model with functions $r_i(p_1, p_2, \ldots, p_k, p_k+1, p_k+2, \ldots, p_n)$ where $i=1, \ldots, m$, the most likely actual values are determined and accumulated for unknown process input parameters $p_k+1, p_k+2, \ldots, p_n$. This is performed by selecting weights $w_i$ ($i=1, \ldots, m$) for the individual device performance characteristics, denoting their relative importance or quality of measurement, and minimizing the difference length of the residual error vector $w_i^*(r_i-rm_i)$ (i=1, ..., m). Typical multidimensional optimization algorithms can be used, such as the Newton-method, nonlinear simplex method, simulated annealing, genetic algorithms or similar. A beneficial part of the algorithm is the compensation for any systematic differences between measured values $r_{i\_m}$ and simulated values $r_{i\_s}$ for functions $r_i(p_1, \ldots, p_n)$. The differences typically arise through imperfect calibration. While the imperfect calibration has an effect on the absolute values for $r_i$, it has only a small effect on the sensitivity of the function $r_i(p_1, \ldots, p_n)$. It is therefore sufficient to 1) estimate the simulated nominal value $r_{i\_n}$ of the function $r_i(p_1, \ldots, p_n)$ from evaluating the function for nominal values $p_{1\_n}, \ldots, p_{n\_n}$, and 2) and determining the averages $r_{i\_m\_ave}$ or medians $r_{i\_m\_median}$ of a number of measured values from the measured values $r_{i\_m}$. The reconstruction is then made for the compensated value $r_{i\_m}-(r_{i\_m\_median}-r_{i\_n})$ or $r_{i\_m}-(r_{i\_m\_ave}-r_{i\_n})$, respectively, if subtraction is used for compensation. Alternatively, the compensated value $r_{i\_m}/r_{i\_m\_median}*r_{i\_n}$ or $r_{i\_m}/r_{i\_m\_ave}*r_{i\_n}$ can be used, respectively, if multiplication is used for compensation.

Example: Using on the TCAD Process Compact Model from the examples above, it is possible to attribute any of the differences between predicted and observed product performance data $V_T$, $I_{ON}$, $I_{OFF}$ to changes in halo implant dose, halo implant tilt, either each by itself, assuming others with assumed values, in combinations of two, or all together. These process parameters are usually not measured, but assumed. Yet, they may be subject to drift or to variation across a wafer. Using the reconstructed (estimated) values for these parameters, it is in turn possible through evaluation of the TCAD Process Model or TCAD Process Compact Model with measured gate oxide thickness, gate critical dimension, reconstructed halo tilt and dose, and RTP temperature from the equipment setting, to predict the product performance characteristic of inverter switching speed.

If the input parameters of the TCAD Process Model or TCAD Process Compact Model comprise all relevant sources of variation in the process parameters and the measurements (of process parameters or responses), the resulting estimate can be considered as being correct. If other sources of variation or noise in the manufacturing process and the measurements exist, the estimation of the unknown parameter is less correct, since the unknown additional variability is attributed to the process parameters under study. Since the resulting variability is larger than the real variability, the estimate serves as a useful upper limit.

Notably, such additional reconstructed data for parameters can be used in conventional yield managements systems. On the basis of the reconstructed or estimated non-measured or non-measurable parameters the yield of manufacturing can be improved.

Use Case No. 3: Feed-Forward Process Enhancement

Figure 4:
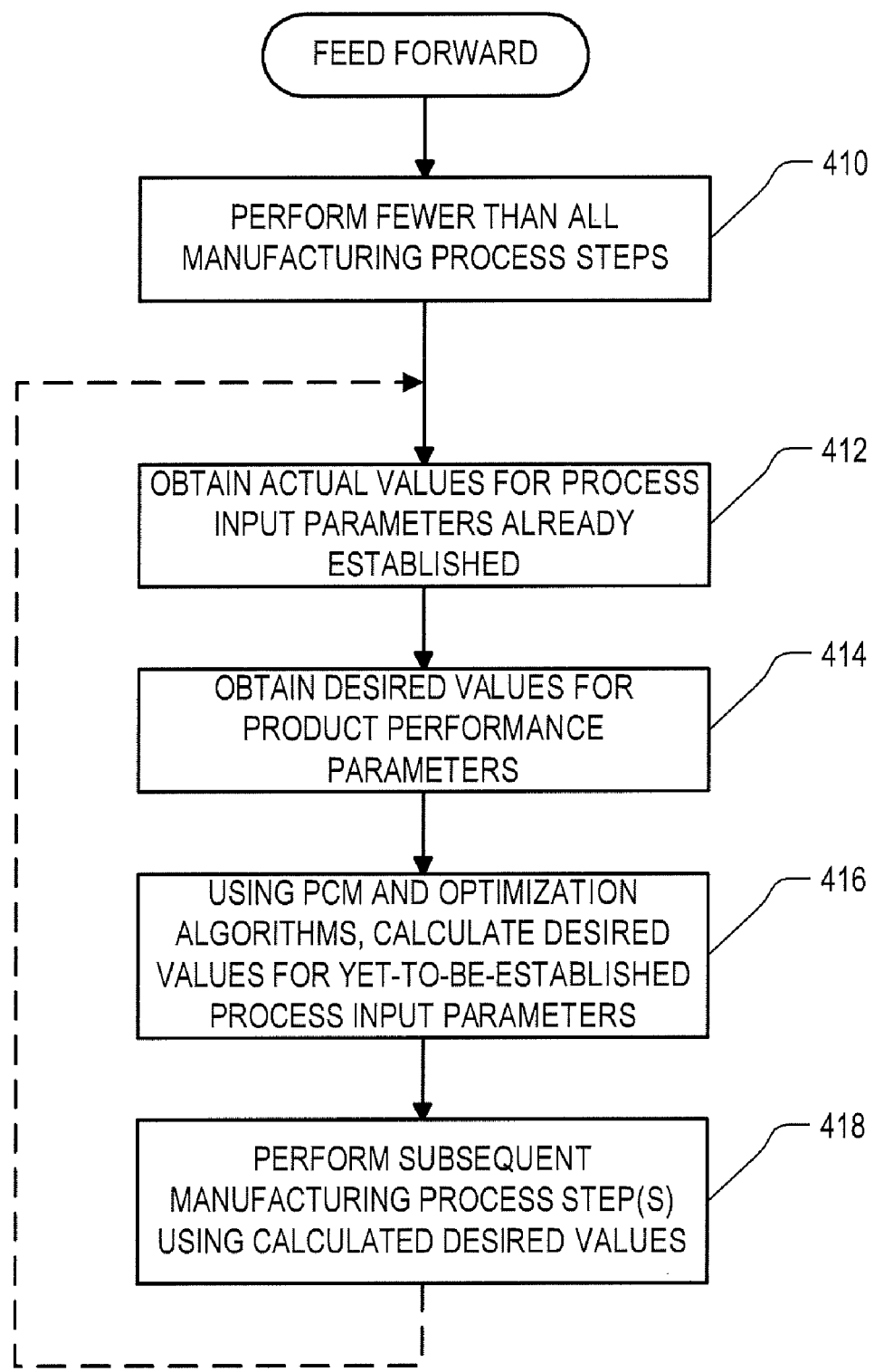

According to the third use case, semiconductor manufacturing processes are optimized during one or more manufacturing step by means of TCAD. FIG. 4 is a flowchart illustrating a method for enhancing the yield in semiconductor manufacturing, wherein semiconductor products are manufactured in a plurality of sequential manufacturing steps.

In step 410, one or more steps of a semiconductor fabrication process are performed, yielding a partially completed or intermediate product. As used herein, the term "process step" can include other process "sub-steps", which are themselves considered herein to be steps in their own right.

In step 412, actual values are obtained for process input parameters already established in the intermediate product. The values can be obtained by measurement or by assumption based on process equipment settings. Alternatively, estimated values can be obtained for some or all of the process input parameters, for example using inverse analysis as described above. This results in values $p_1, p_2, \ldots, p_k$ characterizing characteristic features of the process steps such as film thickness, gate critical dimension, implant angle and dose, anneal temperature, etc.

In step 414, targeted (desired) product performance is characterized with desired values $rt_1, rt_2, \ldots, rt_m$.

In step 416, using a TCAD Process Compact Model with functions $r_i(p_1, p_2, \ldots, p_k, p_k+1, p_k+2, \ldots, p_n)$ where i=1, ..., m, and values $p_1, \ldots, p_k$ for the known process input parameters, desired characteristic values are determined for yet to be performed process steps $p_k+1, p_k+2, \ldots, p_n$. This is performed by selecting weights $w_i$ (i=1, ..., m) for the individual device performance characteristics, denoting their relative importance or quality of measurement, and minimizing the difference length of the residual error vector $w_i^*(r_i-rt_i)$ (i=1, ..., m). Typical multidimensional optimization algorithms can be used, such as the Newton-method, nonlinear simplex method, simulated annealing, genetic algorithms or similar. A beneficial part of the algorithm is the compensation for any systematic differences between measured values $r_{i\_m}$ and simulated values $r_{i\_s}$ for functions $r_i(p_1, \ldots, p_n)$. The differences typically arise through imperfect calibration. While the imperfect calibration has an effect on the absolute values for $r_i$, it has only a small effect on the sensitivity of the function $r_i(p_1, \ldots, p_n)$. It is therefore sufficient to 1) estimate the simulated nominal value $r_{i\_n}$ of the function $r_i(p_1, \ldots, p_n)$ from evaluating the function for nominal values $p_{1\_n}, \ldots, p_{n\_n}$, and 2) and determining the averages $r_{i\_m\_ave}$ or medians $r_{i\_m}$ median of a number of measured values from the measured values $r_{i\_m}$. The determination of optimum parameters is then made for the compensated target value $r_{i\_m}-(r_{i\_m\_median}-r_{i\_n})$ or $r_{i\_m}-(r_{i\_m\_ave}-r_{i\_n})$, respectively, if subtraction is used for compensation. Alternatively, the compensated target value $r_{i\_m}/r_{i\_m\_median}*r_{i\_n}$ or $r_{i\_m}/r_{i\_m\_ave}*r_{i\_n}$ can be used, respectively, if multiplication is used for compensation.

In step 418, subsequent manufacturing steps are performed with $p_{k+1}, \ldots, p_n$ that result from the optimization algorithm, thereby forming a final product or another intermediate product.

Depending on the product it is possible that the steps 412-418 are to be repeated several times until the semiconductor product is finished. The intermediate product is a partially finished product.

The method can be performed in semiconductor manufacturing on a lot level, on a wafer level or on a die level, sometimes also called reticle level. On every level, enhancement of the manufacturing yield is possible, i.e., on a lot level if wafers are manufactured by a lot, on a wafer level if wafers are manufactured in single-wafer processing, and, in both cases, on a die level during die-level processing steps. Examples for die-level processing steps are the exposure of a individual die on the wafer in the stepper, or the annealing of an individual die on the wafer in a laser annealing step.

Example: Using the TCAD Process Compact Model described above, it is possible to partially process a wafer, measure gate oxide thickness and gate critical dimension in one or several locations of the product wafer, determine $V_T$, $I_{ON}$, $I_{OFF}$ as well as the inverter switching speed that are most desirable, assume that the final RTP temperature will not be changed, and, using the described analysis algorithm, determine the most desirable setting for dose and tilt angle of the halo implant step. If measurements are made in more than one location on the wafer, we can determine the best setting from the average of the measurements or from an average that is weighted by the area corresponding to a particular measurement.

As can be seen, a TCAD PCM can be used in a variety of scenarios for the improvement of manufacturing processes. Many of the scenarios can be summarized using the PCM 122 in FIG. 1, as shown together with its process parameter inputs and its product performance parameter outputs. In some scenarios there are values provided for one or more of the process input parameters, whereas in other scenarios there are values provided for one or more of the product performance parameters. In still other scenarios there are values provided for both process input parameters and product performance parameters. The provided values may be in various ones of the scenarios either actual values (measured or assumed based on other knowledge) of process input parameters or product performance parameters, estimated values of process input parameters or product performance parameters based on indirect analysis methods, not-yet-determined values of process input parameters which have not yet occurred, or desired values of product performance parameters. In addition, in some scenarios the PCM 122 is used in the determination of one or more desired, estimated or predicted values for process input parameters, whereas in other scenarios the PCM 122 is used in the determination of desired, estimated or predicted values for product performance parameters.

Using this conceptual framework, the following table provides a summary comparison of certain specific example use cases.

| USE CASE EXAMPLE | BASED ON THESE VALUES | USE PCM TO DETERMINE THESE VALUES |
|---|---|---|
| Performance Prediction for partially completed products | Actual, estimated and/or not-yet-determined but assumed values for process input parameters | Predicted values for product performance parameters |
| Performance Prediction for completed products | Actual or estimated values for process input parameters | Estimated values for product performance parameters |
| Performance Prediction for hypothetical products | Not-yet-determined but assumed values for process input parameters | Predicted values for product performance parameters |
| Inverse Analysis | Actual or estimated values for Some Process Input Parameters and actual values for product performance parameters | Estimated values for Others of the process input parameters |
| Feed Forward for partially completed products | Actual, estimated or not-yet-determined but assumed values for some process input parameters, and desired values for product performance parameters | Desired values for others of the process input parameters |

The method according to the present invention is preferably related to the manufacturing of semiconductor devices, semiconductor test structures, and circuits, especially yield-critical circuits. It is applicable to all semiconductor devices that can be simulated by TCAD. In particular, the manufacturing of transistors can be improved significantly.

Through the use of TCAD models the electrical performance characteristics of the semiconductor devices, a semiconductor test structure or circuit, especially a yield-critical circuit, is optimized. For instance the threshold voltage, drive current or leakage current of a transistor can be regulated and optimized for a particular application. The TCAD model helps to find optimized manufacturing parameters on the basis of parameters measured during the manufacturing process.

TCAD Process Models and TCAD Process Compact Models also allow to optimize for device characteristics that are conventionally not measured in manufacturing because such measurement is fundamentally not possible, difficult or too uneconomical. Examples are the transient characteristics, noise characteristics, high-frequency characteristics, the performance of small circuits with particularly high sensitivity to process parameters, or similar. Notably, such additional data for predicted product performance can be used in conventional yield managements systems. On the basis of the predicted product performance the yield of manufacturing can be improved.

The improvements over conventional process control methods include the use of TCAD for process modeling, the TCAD Process Model being more comprehensive and accurate than other, simplified models, and in the use of TCAD Process Compact Models, which are sufficiently fast, robust accurate and embeddable (meaning that they can easily be integrated into other manufacturing software environments for process control and yield management) to allow deployment and use in a manufacturing environment.

As used herein, a given event or information item is "responsive" to a predecessor event or information item if the predecessor event or information item influenced the given event or information item. If there is an intervening processing step or time period, the given event or information item can still be "responsive" to the predecessor event or information item. If the intervening processing step combines more than one event or information item, the result of the step is considered "responsive" to each of the event or information item. If the given event or information item is the same as the predecessor event or information item, this is merely a degenerate case in which the given event or information item is still considered to be "responsive" to the predecessor event or information item. "Dependency" of a given event or information item upon another event or information item is defined similarly.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. In particular, and without limitation, any and all variations described, suggested or incorporated by reference in the Background section of this patent application are specifically incorporated by reference into the description herein of embodiments of the invention. The embodiments described herein were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

The invention claimed is:

1. A manufacturing process method, comprising the steps of:
  applying a process compact model during processing of a wafer to a manufacturing process of a product to be manufactured on the wafer, the process compact model having a model complexity and runtime optimized for a production environment, the process compact model calculating a value for product performance parameters, during processing of the wafer, in dependence upon a plurality of process input parameters; and
  estimating a value for the product performance parameter in dependence upon the process compact model, and further in dependence upon at least one member of the group consisting of an actual values for a provided subset of the process input parameters and estimated values for a provided subset of the process input parameters,
  wherein the step of estimating comprises the step of estimating a value for the product performance parameter in dependence upon the process compact model.

2. A method according to claim 1, further comprising the step of manufacturing the product, prior to the step of estimating.

3. A method according to claim 1, wherein the step of estimating comprises the step of estimating a value for the product performance parameter in dependence upon the process compact model and further in dependence upon actual values for the provided subset of the process input parameters,
  further comprising the step of measuring the values in the provided subset of the process input parameters.

4. A method according to claim 1, wherein the step of estimating comprises the step of estimating a value for the product performance parameter in dependence upon the process compact model and further in dependence upon estimated values for the provided subset of the process input parameters,
  further comprising the step of estimating the values in the provided subset of process input parameters in dependence upon the process compact model, and further in dependence upon at least one member of the group consisting of actual values for a subset of the process input parameters, estimated values for a subset of the process input parameters, and an actual value for a different product performance parameter.

5. A method according to claim 1, wherein the product performance parameter is commercially incapable of measurement.

6. A manufacturing process method, comprising the steps of:
  developing a process compact model of a manufacturing process including manufacturing steps between bare wafer and device structures, the process compact model applied during processing of a wafer, the process compact model having a model complexity and runtime optimized for a production environment, the process compact model predicting, during processing of the wafer, in dependence upon a plurality of process input parameters, a value for a product performance parameter to be manufactured using the manufacturing process;
  performing a first manufacturing process step on the wafer in the manufacture of the product on the wafer, the first manufacturing process step resulting in an intermediate product; and subsequently
  predicting a value for the product performance parameter in dependence upon the process compact model, and further in dependence upon an assumed value for a particular one of the process input parameters to be used in a second manufacturing process step after the first manufacturing process step.

7. A method according to claim 6, wherein the step of predicting a value for the product performance parameter is performed further in dependence upon an actual value for one of the process input parameters used in developing the intermediate product.

8. A method according to claim 6, wherein the step of predicting a value for the product performance parameter is performed further in dependence upon an estimated value for one of the process input parameters used in developing the intermediate product.

9. A method according to claim 6, further comprising the step of developing a process compact model of the manufacturing process in dependence upon the process compact model, the process compact model calculating a value for the product performance parameter in dependence upon the plurality of process input parameters,
  and wherein the step of predicting comprises the step of predicting a value for the product performance parameter in dependence upon the process compact model.

10. A method according to claim 6, further comprising the step of performing a second process step in the manufacture of the product, after the step of predicting.

11. A method according to claim 10, further comprising the steps of:
  comparing the value obtained in the step of predicting a value for the product performance parameter, with a desired value for the product performance parameter; and
  in response to the step of comparing, adjusting at least one of the process input parameters for the step of performing a second process step.

12. A method according to claim 10, wherein the step of performing a second process step comprises the steps of:
  determining a desired value for a particular one of the process input parameters used in the second process step, in dependence upon the process compact model and further in dependence upon a desired value for the product performance parameter; and
  performing the second process step in dependence upon the desired value for the particular process input parameter.

13. A manufacturing process system, comprising:
  a process compact model of a manufacturing process, the process compact model applied during processing of a wafer, the process compact model having a model complexity and runtime optimized for a production environment, the process compact model predicting, during processing of the wafer, a value for a product performance parameter in dependence upon a plurality of process input parameters; and
  estimating means for estimating a value for the product performance parameter in dependence upon the process compact model, and further in dependence upon at least one member of the group consisting of actual values during processing of the wafer for a provided subset of the process input parameters and estimated values for a provided subset of the process input parameters.

14. A manufacturing process system, comprising:
  a process compact model of a manufacturing process including manufacturing steps between bare wafer and device structures, the process compact model applied during processing of a wafer, the process compact model having a model complexity and runtime optimized for a production environment, the process compact model predicting, during processing of the wafer, in dependence upon a plurality of process input parameters, a value for a product performance parameter to be manufactured using the manufacturing process;

predicting means for, after performance of a first manufacturing process step on a wafer in the manufacture of the product on the wafer, the first manufacturing process step resulting in an intermediate product, predicting a value for the product performance parameter in dependence upon the process compact model, and further in dependence upon an assumed value for a particular one of the process input parameters to be used in a second manufacturing process step after the first manufacturing process step.

* * * * *